H. SHIPP.
PIPE COUPLING.
APPLICATION FILED FEB. 9, 1912.
1,026,966.
Patented May 21, 1912.
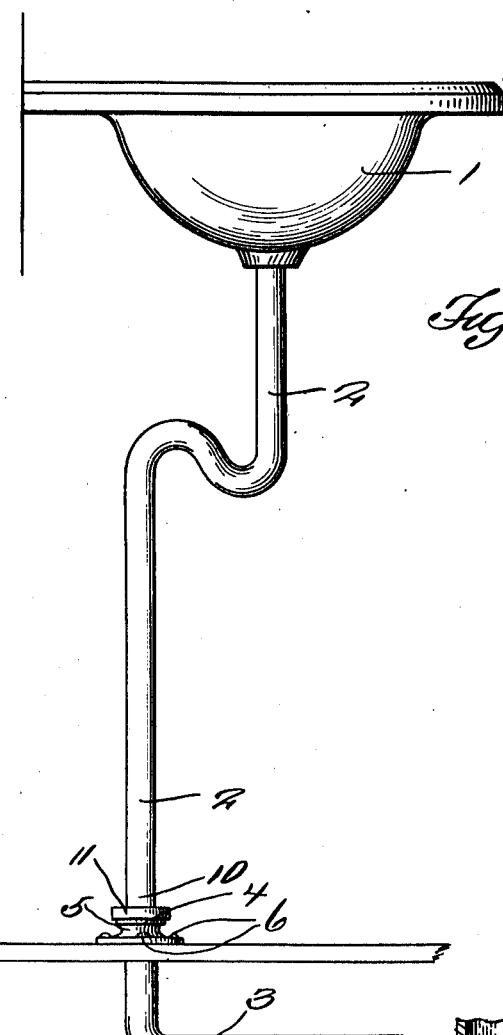
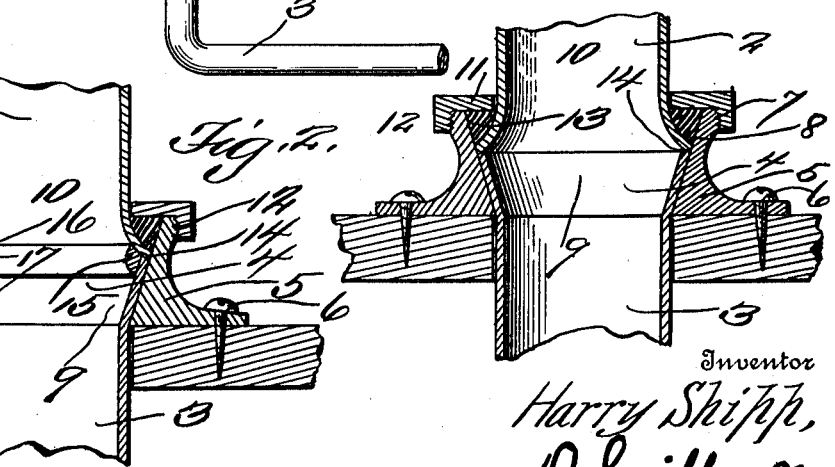
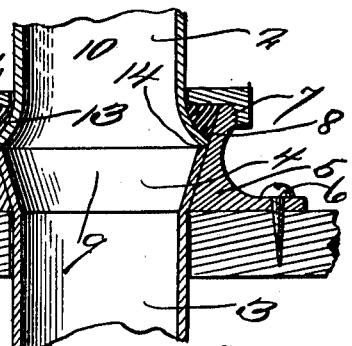
Inventor
Harry Shipp,
By D. Swift & Co.
Attorneys
Witnesses
Francis F. Boswell,
C. E. Frothingham,

UNITED STATES PATENT OFFICE.

HARRY SHIPP, OF IDA GROVE, IOWA.

PIPE-COUPLING.

1,026,966.  Specification of Letters Patent.  Patented May 21, 1912.

Application filed February 9, 1912. Serial No. 676,543.

*To all whom it may concern:*

Be it known that I, HARRY SHIPP, a citizen of the United States, residing at Ida Grove, in the county of Ida and State of Iowa, have invented a new and useful Pipe-Coupling; and I do hereby declare the following to be a full, clear, and exact description of the invention, such as will enable others skilled in the art to which it appertains to make and use the same.

This invention relates to a new and useful joint (which may be termed a slip joint) between the trap pipe and the waste water pipe of a sink wash bowl or the like.

It is the object of this invention to eliminate all soldered and wiped joints between such pipes.

It is a further object of the invention, to produce a joint of this design, in which simple, yet novel, practical, efficient, and desirable features of construction are involved.

One of the features of the construction is that the adjoining ends of the trap pipe and the waste water pipe are outwardly flared in contact with a beveled annular wall of the coupling member of the joint.

The detail features of the device are hereinafter set forth, shown and claimed.

In the drawings:—Figure 1 is a view in elevation, showing the application of the improved joint. Fig. 2 is a sectional view through the joint. Fig. 3 is a view similar to Fig. 2 showing a different structure.

Referring to the drawings 1 designates a sink or washbowl, from which the usual trap pipe 2 downwardly extends. The lower end of the trap pipe 2 is coupled to the waste water pipe 3 by the joint 4. This joint 4 includes the flanged ring 5, which is bolted or otherwise secured to the flooring, as at 6. This flanged ring is exteriorly threaded as shown at 7, and is provided with an inner beveled annular wall 8, against which the wall of the waste water pipe at the end 9 thereof is pressed. The lower end 10 of the trap pipe 2 extends through the collar or cap 11, which is provided with an annular threaded flange 12, to engage the thread 7 of the ring 5. The lower extremity of the trap pipe is outwardly flared, against the gasket 13 of any suitable material, and also against the bevel wall 8 of the ring 5, so as to prevent displacement of the trap pipe. The peripheral portion 14 of the lower end
of the trap pipe engages the peripheral portion of the flared end of the waste water pipe. By this arrangement the ends of the adjoining pipes are held in place. The adjoining ends of the pipes are further held in position by the ring 15, the outer annular face of which is provided with opposite beveled surfaces 16 and 17, to engage the inner portions of the adjoining pipes, at the point where they come together. The end 10 of the trap pipe is first passed through the collar 11, and then flared sufficiently, after which the same is arranged in contact with the end 9 of the pipe 3, and subsequently the collar 11 is screwed home. However, the ring 15 is placed in position in the end 9 of the pipe 3, prior to arranging the end 10. The ring 15 is dispensed with in Fig. 3.

The invention having been set forth, what is claimed as new and useful is:

1. In combination, a pair of adjoining pipes having their adjoining ends flared, a flanged ring having an inner beveled wall with which the flared ends of the pipes contact, a gasket surrounding the flared end of one of the pipes, and arranged in the ring against the bevel wall, a collar exteriorly surrounding one of the pipes above its flared end and threaded to the ring.

2. In combination, a pair of adjoining pipes having their adjoining ends flared, a flanged ring having an inner beveled wall with which the flared ends of the pipes contact, a gasket surrounding the flared end of one of the pipes, and arranged in the ring against the bevel wall, a collar exteriorly surrounding one of the pipes above its flared end and threaded to the ring, the flared ends of the pipes having their adjacent peripheral portions arranged in contact with one another to prevent displacement, and a ring having outer oppositely beveled surfaces arranged interiorly of the flared ends and in contact therewith at the point where the peripheral portions of the pipes come together.

In testimony whereof I have signed my name to this specification in the presence of two subscribing witnesses.

HARRY SHIPP.

Witnesses:
F. A. BRECHWALD,
T. E. MURPHY.